United States Patent
Rethwish

[54] NON-TILTING PROBE

[72] Inventor: William F. Rethwish, Bonita, Calif.

[73] Assignee: Rohr Corporation, Chula Vista, Calif.

[22] Filed: May 22, 1970

[21] Appl. No.: 39,934

[52] U.S. Cl. ..................................................33/174 L
[51] Int. Cl. ......................................................G01b 7/28
[58] Field of Search...................33/174 L, 23 K, 169; 90/62

[56] References Cited

UNITED STATES PATENTS

| | | | |
|---|---|---|---|
| 3,571,934 | 3/1971 | Buck | 33/174 L |
| 3,541,924 | 11/1970 | Gambin | 90/62 |
| 2,439,565 | 4/1948 | Egor | 33/172 R |
| 2,433,005 | 12/1947 | Turchan et al. | 90/62 |

*Primary Examiner*—Harry N. Haroian
*Attorney*—George E. Pearson

[57] ABSTRACT

An inspection probe comprises a housing for mounting on an inspection element of a programmed type of metal working machine.

A coaxial assembly of parts is mounted in the housing, said assembly comprising an elongated inspection tip mounted for axial movement coaxially of a bearing, the bearing being mounted coaxially within a bearing support, which in turn is mounted for guided movement in a plane at right angles to the common axis of said assembly.

A restraining sleeve is mounted coaxially on the bearing assembly for limited axial movement to either of two adjusted, detent latched positions. In one adjusted, detent latched position of the restraining sleeve, the bearing assembly is restrained against lateral movement, but the inspection tip is free for movement axially of the assembly. In the other adjusted, detent latched position of the restraining sleeve, the inspection tip is restrained against axial movement but is free, with the bearing assembly, for guided movement in such plane at right angles to the inspection tip axis.

Electrical transducer means are actuated by movement of the inspection tip with the restraining sleeve in either of said adjusted, detent latched positions to accurately measure and indicate the amount of inspection tip movement in either of said directions.

10 Claims, 5 Drawing Figures

INVENTOR.
WILLIAM F. RETHWISH

BY

George E. Pearson
ATTORNEY

INVENTOR.
WILLIAM F. RETHWISH
BY
ATTORNEY

INVENTOR.
WILLIAM F. RETHWISH
BY
George E. Pearson
ATTORNEY

NON-TILTING PROBE

BACKGROUND OF THE INVENTION

In the manufacture of machined parts by programmed machines, such as a well known numerically controlled or N/C machine, an inspection spindle is usually provided which can be programmed to move successively to accurate, predetermined zones or points of a machined workpiece for carrying measuring means to such zones or points. Such measuring means measure and indicate, and if desired, record, measurements of such predetermined zones or points either during, or upon completion of, selected operations performed by the machine. An inspection probe of the same general type as the present invention is disclosed in my co-pending U.S. patent application Ser. No. 756,649, filed Aug. 30, 1968, now U.S. Pat. No. 3,520,063, and assigned to the assignee of the present invention.

While the inspection probe disclosed in that application has proven highly satisfactory for many uses, it is provided with a tilting inspection tip which is not entirely satisfactory for taking certain measurements in instances where a surface to be measured slants relative to the direction of movement of the probe in contacting such surface. In such case the slanting surface exerts a camming influence on the probe which may prevent an accurate reading. Additionally, as mentioned in said application, tilting of the probe requires that certain conical ball seat recesses in the probe be provided with slightly curved walls to compensate for the tilting of the probe axis in order to avoid erroneous readings.

SUMMARY OF THE INVENTION

A primary objective of the present invention is to provide an improved inspection probe for mounting on a metal working machine whereby an elongated inspection tip may be freed, selectively, for movement either axially thereof, or in a direction at right angles to its axis. Another important objective of the invention is to provide an inspection probe having a non-tilting inspection tip. Transducer means actuated by movement of the inspection tip accurately measures and indicates, and if desired records, movement of the inspection tip either axially thereof or at right angles to its axis.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
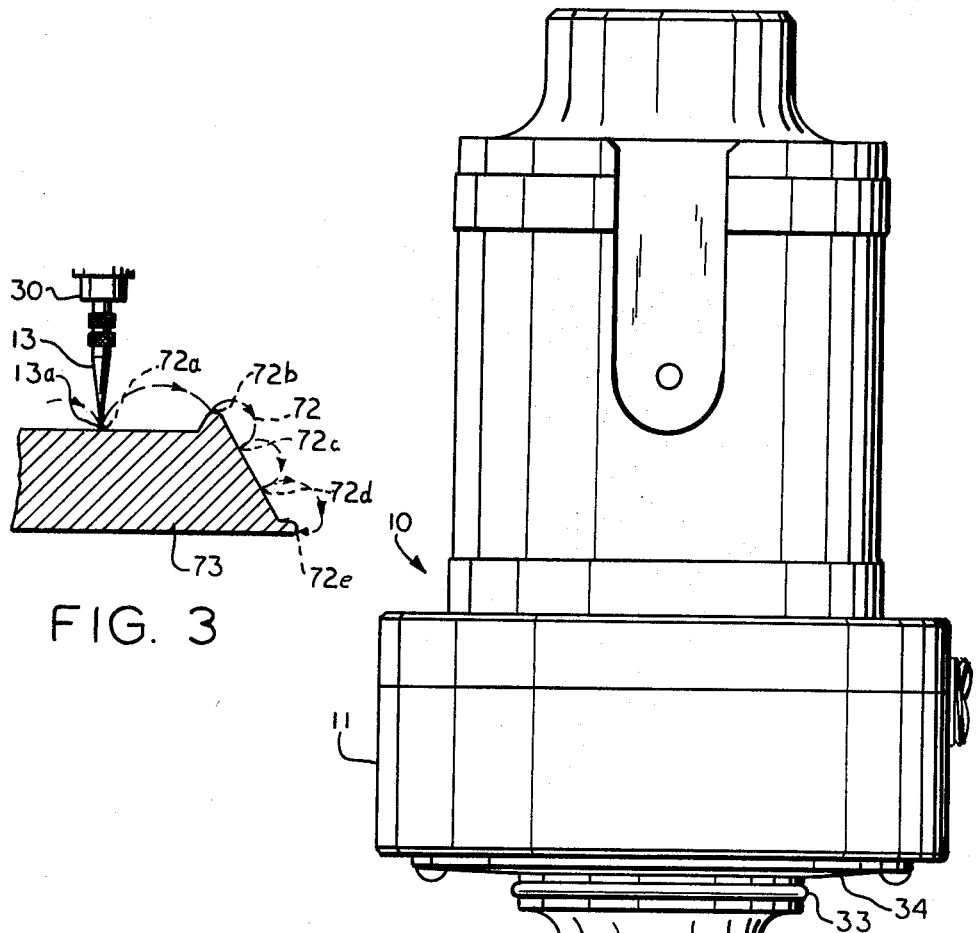
FIG. 1 is a side elevational view of an inspection probe embodying the present invention, a terminal portion of the inspection tip being broken away.

In the illustrative embodiment of the invention shown in the drawings, an inspection probe A comprises a generally cylindrical, two part housing 10 having an enlarged lower end portion 11, the reason for which will be apparent later herein. Screws 10a hold the two parts of the housing together. Suitable mounting means such as a threaded socket 12 in the upper end of the housing 10 is provided for mounting the probe A on a conventional inspection spindle, not shown, of an N/C or other machine on which the probe is to be mounted for use.

An elongated inspection tip 13 is of circular cross sectional shape with a straight axis, and its upper end is fitted coaxially into an axial socket in the lower end of an externally threaded chuck body 14. The inspection tip 13 is fixedly retained coaxially in the chuck body 14 by a threaded chuck ring 15, which is screwed onto the chuck body 14 to grip an annular retaining flange 17, see FIG. 4, on the inspection tip 13. The chuck body 14 also has a socket in its upper end which fits coaxially onto the reduced lower end portion of the stem portion 18a of a T shape actuator 18, and is fixedly secured thereon by an axial screw 19, see FIG. 4.

Figure 3:
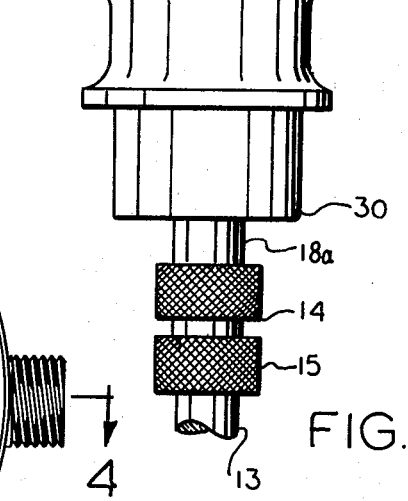
FIG. 3 is a diagrammatic, side elevational view in reduced scale showing in broken lines the path of a terminal portion of the inspection tip during successive movements of the probe in checking dimensions of a machined workpiece, a fragment of the latter being shown in vertical section.
Figure 2:
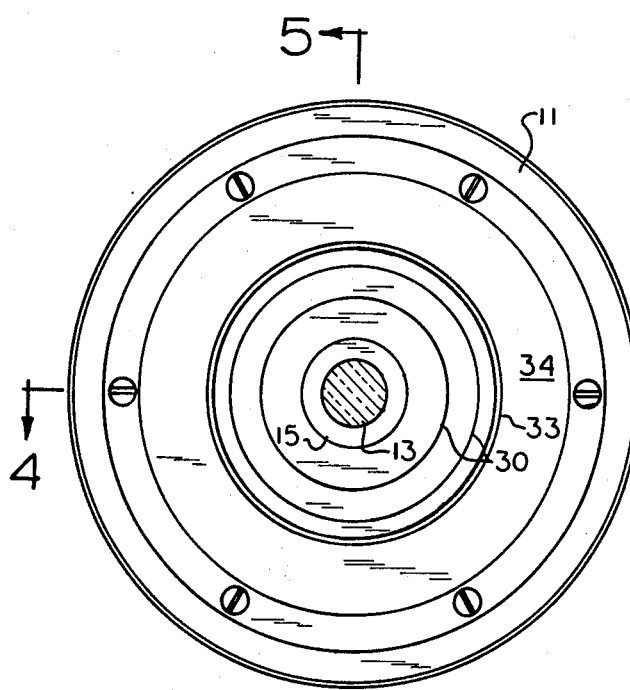
FIG. 2 is an end elevational view of the lower end of the probe as shown in FIG. 1.
Figure 4:
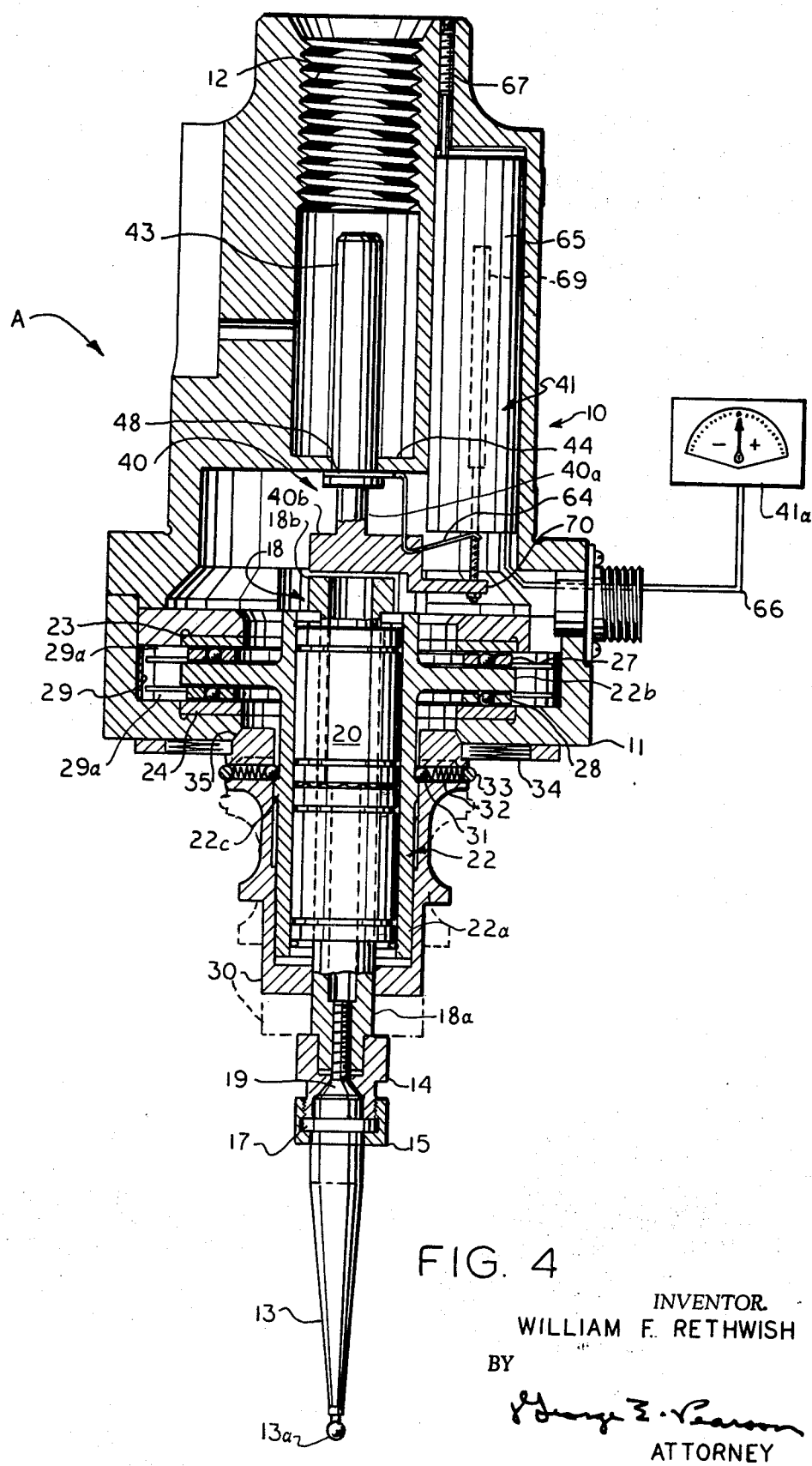
FIG. 4 is a sectional view taken along line 4—4 of FIG. 2.

The actuator stem portion 18a, see FIGS. 3 and 4, is mounted for free, axial, slidable movement in the axial bore of a slide bearing 20 which may be of the well known recirculating ball bearing type to provide minimum frictional resistance to axial movement of the actuator stem portion 18a therein. The actuator head portion 18b, best shown in FIG. 5, has two similar conical ball seating recesses 21 in its upper side.

The slide bearing 20 is fitted coaxially within the bore of the tubular body portion 22a, see FIG. 4, of a bearing support member 22, and is anchored in axially adjusted position therein by a pair of conventional snap rings fitted into a pair of annular grooves provided in the bore of the bearing support member 22, one at each end of the slide bearing 20.

An integral, annular, radial guide flange 22b is provided on the tubular body portion 22a of the bearing support member 22 near its upper end. The upper and lower faces of the radial guide flange 22b are planar, smooth, parallel, and at right angles to the common axis of the assembly comprising the bearing support member 22, slide bearing 20, actuator stem 18a and inspection tip 13. These flange faces preferably are hardened, as are also the exposed faces of a pair of Annular, washer-like inserts 23 and 24, which are fitted in parallel relation into seats provided coaxially in the housing 10. A pair of ring type ball bearings 27 and 28 are mounted between the upper and lower faces of the flange 22 and the inserts 23 and 24, respectively to limit movement of the bearing member 22 and its coaxially assembled parts to a plane at right angles to the common axis of these parts.

An annular, bearing centering member 29, see FIG. 4, of thin, ribbon, spring metal is fitted into the housing 10 around the annular flange 22b, and a plurality of thin, light, spring fingers 29a are severed by slitting, except at one end thereof, from the upper and lower edge portions of the annular ribbon 29. These fingers 29a are bent angularly inwardly in a well known manner so that their free ends lightly engage the annular ball bearings 27 and 28 and urge them toward centered condition in the housing 10.

For cOntrollinG the direction in which the inspection tip 13 is free to move i.e., either axially thereof or at right angles to its axis, a restraining sleeve 30 is fitted for limited, slidable, axial movement on an integral, annular band portion 22c, see FIG. 4, surrounding a central portion of the tubular body portion 22a of the bearing support member 22. The annular band portion 22c is of slightly larger diameter than the remainder of the tubular body portion 22a, and has beveled upper and lower edges to provide sloping ramps for detent engagement by a plurality of spring biased detent balls 31.

The detent balls 31 are mounted, one in each of a plurality of radially extending holes in the restraining sleeve 30, and a biasing coil spring 32 is inserted in each of these holes radially outwardly of the detent ball 31 therein. These biasing springs 32 are retained under compression in their respective holes by a spring wire snap ring 33, which encircles the restraining sleeve 30 over the radial holes and is seated in an annular groove provided in the restraining sleeve. A conventional bellows 34 seals the gap between the restraining sleeve 30 and the housing 10 when the sleeve 30 is in its lowered position as shown in FIG. 5 and in broken lines in FIG. 4.

Figure 5:
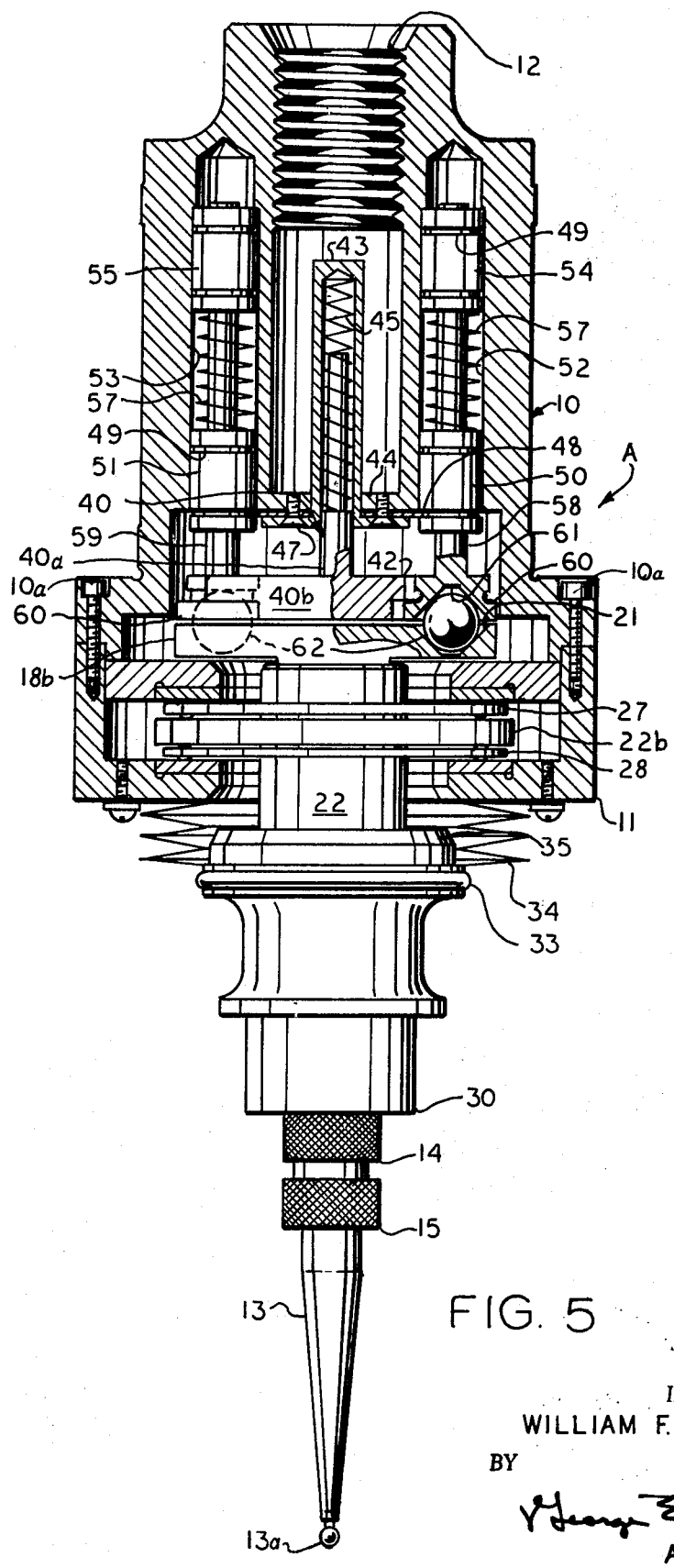
FIG. 5 is a sectional view taken along line 5—5 of FIG. 2.

When the restraining sleeve 30 is moved axially upwardly to its upper limit of movement on its band 22c to its position shown in FIG. 1 and in solid lines in FIG. 4, the detent balls 31 are spring biased radially inwardly onto the upper beveled edge of the band 22c, thereby latching the restraining sleeve 30 with a beveled upper edge 35 thereof, see FIGS. 4 and 5, seated in a beveled seat surrounding an axial hole in the lower end of the housing 10. When the restraining sleeve 30 is thus latched in its upper limit of movement, said sleeve and the parts assembled coaxially therein and comprising the slide bearing 20, the T shape actuator 18 and the inspection tip 13 are all restrained against lateral movement. However, in such upwardly latched position of the restraining sleeve 30 the chuck body 14 is spaced downwardly from the lower end of the restraining sleeve 30, as shown in solid lines in FIG. 4, so that the inspection tip 13 and the actuator 18 connected thereto are free to move axially of the inspection tip 13.

For measuring movement of the inspection tip 13 either axially thereof or at right angles to its axis, as determined by the adjusted, latched position of the restraining sleeve 30 as explained previously herein, an inverted, T shape follower 40 is provided as shown in FIGS. 4 and 5, and this follower actuates suitable electrical transducer means including a linear variable differential transformer or LVDT 41, see FIG. 4, of a well known type. Suitable readout means 41a are operatively connected to the LVDT as indicated diagrammatically in FIG. 4.

Upon moving the restraining sleeve 30 axially downwardly on the band 22c to its lower limit of movement, as shown in FIG. 5 and in broken lines in FIG. 4, with the detent balls 31 seated on the sloping lower edge of the band 22c, the lower end of the restraining sleeve 30 engages the chuck body 14 and restrains said chuck body 14, together with the inspection tip 13 and actuator 18, in their lower limit of movement with the actuator head portion 18b seated on the upper end of the tubular portion 22a of the bearing support member 22.

In such downwardly detent latched position of the restraining sleeve 30, the beveled upper end 35 of the restraining sleeve 30 is withdrawn clear of its beveled seat in the housing 10, as shown in broken lines in FIG. 4, thereby freeing the bearing support member 22 and the parts assembled coaxially therewith for lateral movement in a plane defined by the flange 22b riding between the ring bearings 27 and 28.

The inverted, T shape follower 40 comprises a stem portion 40a of circular cross section, with the upper portion thereof of reduced diameter, and a head portion 40b having an endwise open, undercut notch 42 in each end thereof. The follower stem portion 40a is inserted upwardly for free, axial, slidable movement, in an inverted, elongated, flanged, cup shape housing 43. The latter is fitted upwardly into an axial opening provided in a web 44 in the housing 10 at the bottom of an unthreaded extension of the threaded mounting socket 12. A light coil spring 45 is held in slight compression between a shoulder on the stem 40a and the upper end of the housing 43.

A pair of small screws 47, see FIG. 5, retain the cup shape housing 43 in position, and a thin, spring sheet metal bearing retainer plate 48 is gripped in interposed position between the flange of the housing 43 and the housing web 44. The retainer plate 48 fits into annular grooves 49, see FIG. 5, provided one near the lower end of each of a pair of similar, lower slide bearings 50 and 51. The latter are fitted, respectively, into the lower ends of a pair of holes 52 and 53 in the upper end portion of the housing 10, axially parallel to the housing axis. A pair of similar, upper slide bearings 54 and 55 are also inserted coaxially in the holes 52 and 53, respectively, and are held at the upper ends of their respective holes by coil springs 56, which are held in compression between each lower bearing and its associated upper bearing.

A pair of identical, ball-actuated guide pins 58 and 59, see FIG. 5, are fitted for free, axial movement, one in each aligned pair of axial bearings 50, 54 and 51, 55, respectively. Each guide pin 58 and 59 has a stepped head 60 on its lower end, which fits for self-centering movement, one into each of the undercut notches 42 in the ends of the follower head 40b.

A conical recess 61 is provided coaxially in the head 60 of each guide pin 58 and 59 to seat on a ball 62 interposed between each of the conical recesses 61 and one of the conical recesses 21 in the head 18b of the T shape actuator 18. Both of the conical recesses 21 and 61 contacting each of the two interposed balls 62 are axially parallel to each other, and to the inspection tip 13, and are spaced apart, and from the axis of the stem portion of their respective T shape members 18 and 40 by equal distances. Each of said conical recesses has an included apex angle of 90° so that their sides slope at an angle of 45° to their respective conical axes.

The light coil spring 45 urges the follower 40 gently downwardly, so that the undercut notches 42 in the ends of the follower head 40b, bearing on the stepped heads 60 of the guide pins 58 and 59, urge these guide pins, and thereby the balls 62 downwardly, thereby tending to seat the balls in centered position between their respective conical recesses 21 and 61, and to urge the actuator 18 downwardly toward a normal, or unactuated position coaxially of the housing 10 and with its head 18b resting on the upper end of the body 22a of the bearing support member 22.

With the inspection tip 13 thus centered in its lowermost position, and the restraining sleeve 30 latched in its upper limit of movement as shown in solid lines in FIG. 4, upon any upward, axial movement of the inspection tip 13, the actuator 18, seated balls 62, guide pins 58 and 59, and follower 40 are all moved upwardly the same distance.

With the restraining sleeve 30 latched in its lower limit of movement as shown in FIG. 5, and in broken lines in FIG. 4, upon any lateral movement of the inspection tip 13 the entire coaxial assembly including the inspection tip 13, actuator 18, slide bearing 20 and flanged bearinG support 22 are moved thereby in a plane at right angles to the common axis of this assembly under the guidance of the flange 22b riding between the ring bearings 27 and 28. Upon any such lateral movement, the conical recesses 21 in the head 18b of the actuator 18 are offset laterally from their respective counterparts 61 in the guide pins 58 and 59, whereby the balls move along the 45° sloping sides of their respective recesses 2 and 61, and the follower 40 is moved upwardly thereby an amount equal to the lateral displacement of the inspection tip 13.

In order to indicate, and if desired record, the amount of movement of the inspection tip in either direction as set forth previously herein, the L.V.D.T. 41 and readout mechanism 41a are provided. The illustrated L.V.D.T. comprises a transformer coil 65 fitted for axial adjustment into a hole provided in the upper end of the housing 10' and parallel to the housing axis. A finger 64 extending integrally from a side of the spring metal bearing retainer plate 48 resiliently urges the coil 65 upwardly in its hole in the housing 10, while a coil adjusting screw 67 screwed through a threaded hole in the upper end of the housing 10 bears against the upper end of the coil 65 for adjusting the zero reading of an associated readout mechanism 41a shown diagrammatically in FIG. 4. The readout mechanism may be of a well known type which includes recording mechanism.

A usual transformer core 69 of the L.V.D.T. is mounted in axially adjusted position on a rigid support finger 70, see FIG. 4, formed integrally on, and extending laterally from, the head 40b of the T shape follower 40 for movement of the core 69 coaxially within the bore of the coil 65 in conformance with movement of the follower 40.

Usual flexible conductors 66 or other suitable means are provided to conduct varying operating electrical current from the L.V.D.T. coil 65 to the readout and/or recording mechanism 41a. The latter is calibrated in a usual manner to transduce current variations from the coil 65 into units of linear measurement, thereby indicating amOunts of axial movement of the follower 40. Since this and other suitable transducer indicating and recording means are well known, the details thereof are omitted.

OPERATION

It is assumed that the terminal portion 13a of the inspection tip 13 is in the form of a sphere of 0.100 inch radius, and centered on the inspection tip axis and that the L.V.D.T. 41 and its readout mechanism 41a are pre-calibrated in a usual manner and are pre-adjusted, for example, by means of the screw 67, so that an upward movement of the follower 40 of 0.100 of an inch from its lowermost position as shown in FIGS. 4 and 5 will produce a "zero" reading on the readout mechanism 41a.

With the inspection tip 13 having such a terminal sphere 13a of 0.100 inch radius, and the mechanism adjusted as assumed the readout mechanism 41a will, by such "zero" reading, indicate that a surface being checked is at its proper location. A positive reading under the same conditions indicates that such surface is high or over by the indicated amount, while a negative reading indicates that such surface is low or short by the indicated amount, up to the limit in the latter case of 0.100 of an inch beyond which amOunt the inspection tip will not contact such surface.

With the probe A mounted on an inspection spindle, not shown, of a metal working machine programmed to machine a workpiece 73, see FIG. 3, to the conformation shown in FIG. 3, the machine is also programmed to move the inspection probe A so as to cause the terminal spherical portion 13a to move along the broken line 72 in the direction of the arrows to contact successive portions of the workpiece 73 indicated by the numerals 72a-72e in sequence as such portionS are machined. It is to be noted that for inspecting the points 72a and 72b the latching sleeve 30 will be in its upper limit of movement to limit the inspection tip to axial movement, while for inspecting the points 72c-72e the sleeve will be in its lower limit of movement.

It will be obvious to one familiar with the use and operation of such mechanisms, that in the event a terminal portion of a different size or shape is used on the inspection tip, the zero setting of the readout mechanism may have to be adjusted accordingly.

The invention provides a simple, effective, rugged and relatively inexpensive inspection probe for use on automatic or other machines, and one which provides a positive and accurate reading regardless of the angle of a surface contacted by the inspection tip to the axis of the inspection tip.

Having now fully disclosed my invention, what I claim as new and useful and desire to protect by U. S. Letters Patent is:

1. A non-tilting inspection probe comprising
   3 housing,
   means for mounting the housing on an inspection element of a metal working machine,
   an assembly of parts mounted in the housing for guided, universal movement limited to a selected plane,
   one of the parts of said assembly comprising an actuator mounted for guided movement along an axis at right angles to said selected plane,
   an elongated inspection tip mounted on the actuator for movement therewith,
   means for selectively restraininG said assembly against movement in such selected plane while leaving the actuator and inspection tip free for movement along such axis, and for restraining the actuator and inspection tip against movement along such axis while leaving said assembly free for guided, universal movement along such selected plane, and
   transducer means operatively connected to the actuator and inspection tip for measuring and indicating movement of the actuator and inspection tip selectively along such selected plane and along such axis.

2. An inspection probe as claimed in claim 1 wherein the assembly of parts comprises the actuator mounted for axial movement coaxially within a bearing, the bearing mounted coaxially within a bearing support member, and the bearing support member mounted for guided universal movement limited to a plane at right angles to the common axis of said actuator, bearing and bearing support member.

3. An inspection probe as claimed in claim 2 wherein the bearing support member has a radial flange thereon disposed in a plane at right angles to the common axis of said assembly of parts, a pair of ring type ball bearings mounted in the housing with one of the ring type bearings in bearing, supported engagement with each side of said flange, and means resiliently urging the bearings toward a selected centered position.

4. An inspection probe as claimed in claim 2 wherein the restraining means comprises a sleeve mounted for axial slidable movement coaxially on the bearing support member, said sleeve being movable between a first latched position in interfitted relation with an element of the housing for restraining the actuator and inspection tip against movement in said selected plane, and a second latched position free of the housing and in endwise engagement with an element movable with the actuator and inspection tip for restraining the actuator and restraining tip against axial movement.

5. An inspection probe as claimed in claim 4 wherein a plurality of spring biased detent balls are mounted on in each of a similar plurality of radial holes in the restraining sleeve, and bear against an enlarged band provided on the bearing support member, the band being of a width, and so located, that in said first latched position of the sleeve the detent balls have detent, latching engagement with one end of the band, and in said second latched position of the sleeve the detent balls have detent, latching engagement with the other end of the band.

6. An inspection probe as claimed in claim 1 wherein follower means is mounted in alignment with the actuator for movement axially parallel thereto and, facing, portions of the actuator, and follower means having axially parallel, conical recesses therein, which recesses are coaxially aligned when the actuator is in centered position in the housing, and a spherical ball is seated in the recesses for transmission of axial and transverse movement of the inspection tip via the actuator and the follower to the transducer means.

7. An inspection probe as claimed in claim 6 wherein spring means acting between the housing and the follower lightly urges the balls to seated condition in their recesses, and the inspection tip to extended position.

8. An inspection probe as claimed in claim 6 wherein the transducer includes an LVDT having a tubular transformer coil thereof mounted in the housing axially parallel to the direction of follower movement, and a core of the transformer is fixedly attached to the follower for movement therewith and is mounted for free Axial movement within the tubular coil.

9. An inspection probe as claimed in claim 6 wherein the follower means comprises an inverted T shape portion and a pair of headed pins fitted for axial slidable movement one in each of a pair of bearings mounted in the housing axially parallel to each other and to the actuator, the head of each headed pin being in operative engagement with a head portion of the T shape actuator and having one of the conical recesses therein.

10. An inspection probe as claimed in claim 8 wherein spring means acting between the housing and the coil biases the coil endwise in one direction, and a screw, in threaded engagement with a housing element, urges the coil in the opposite direction for axial adjustment of the coil.

* * * * *